Figure 4:
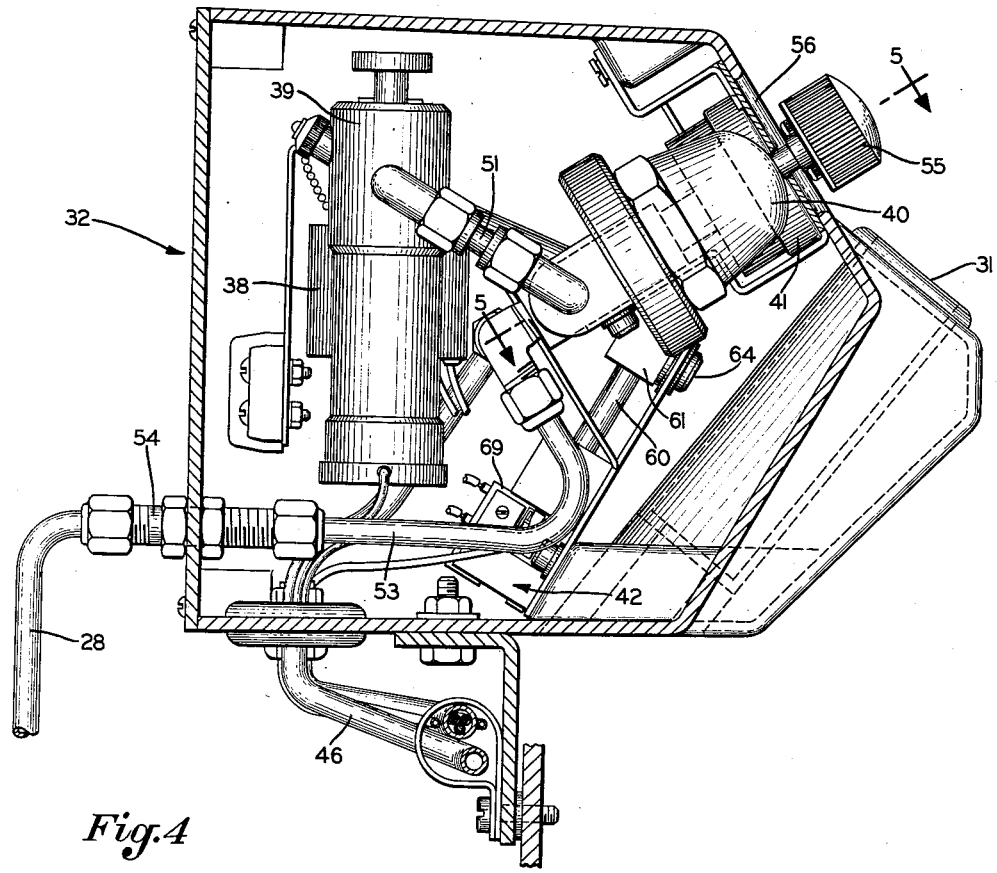

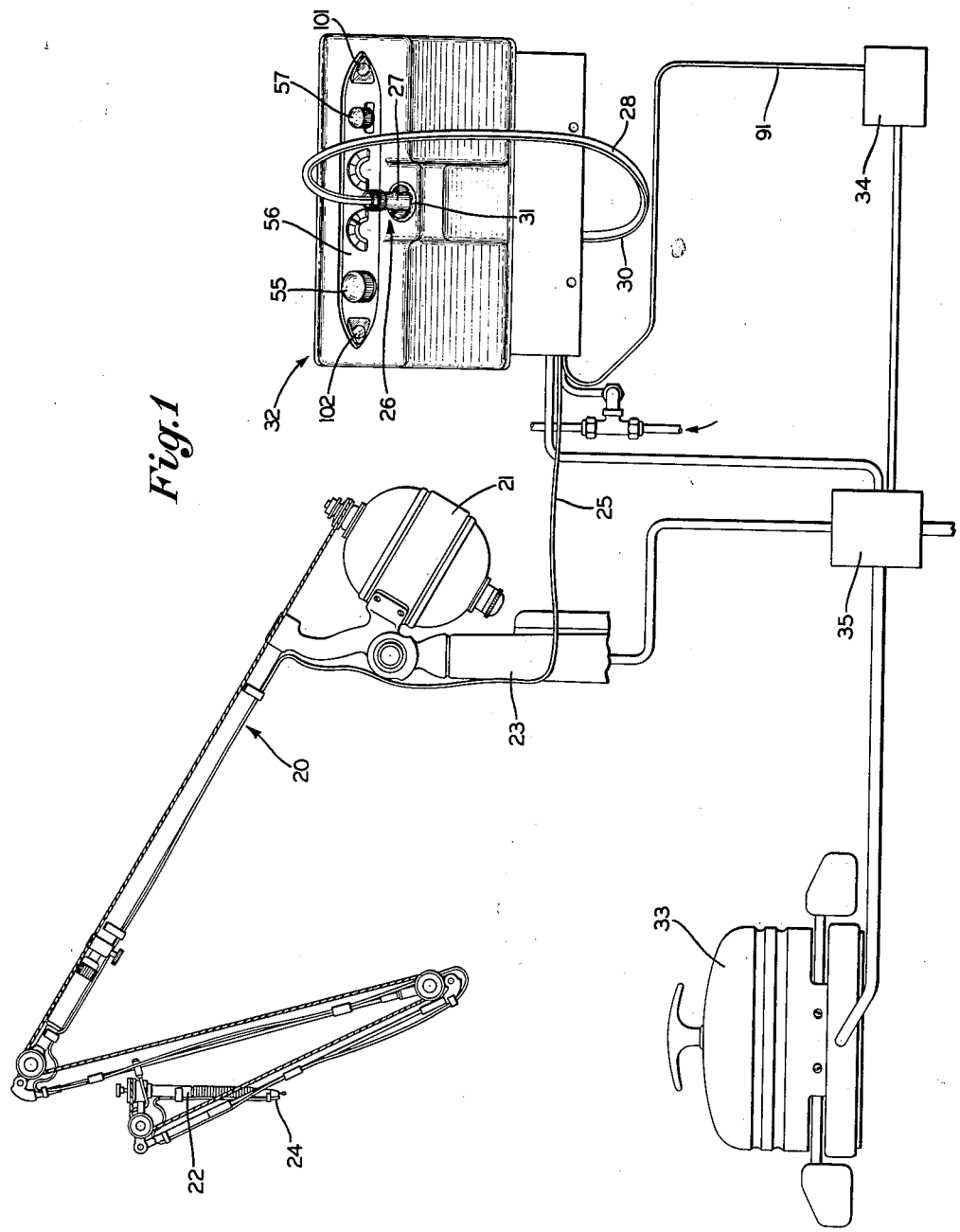

June 25, 1963  J. A. MAURER ETAL  3,094,780
DENTAL CONTROL ASSEMBLIES
Filed Nov. 1, 1957
6 Sheets-Sheet 2
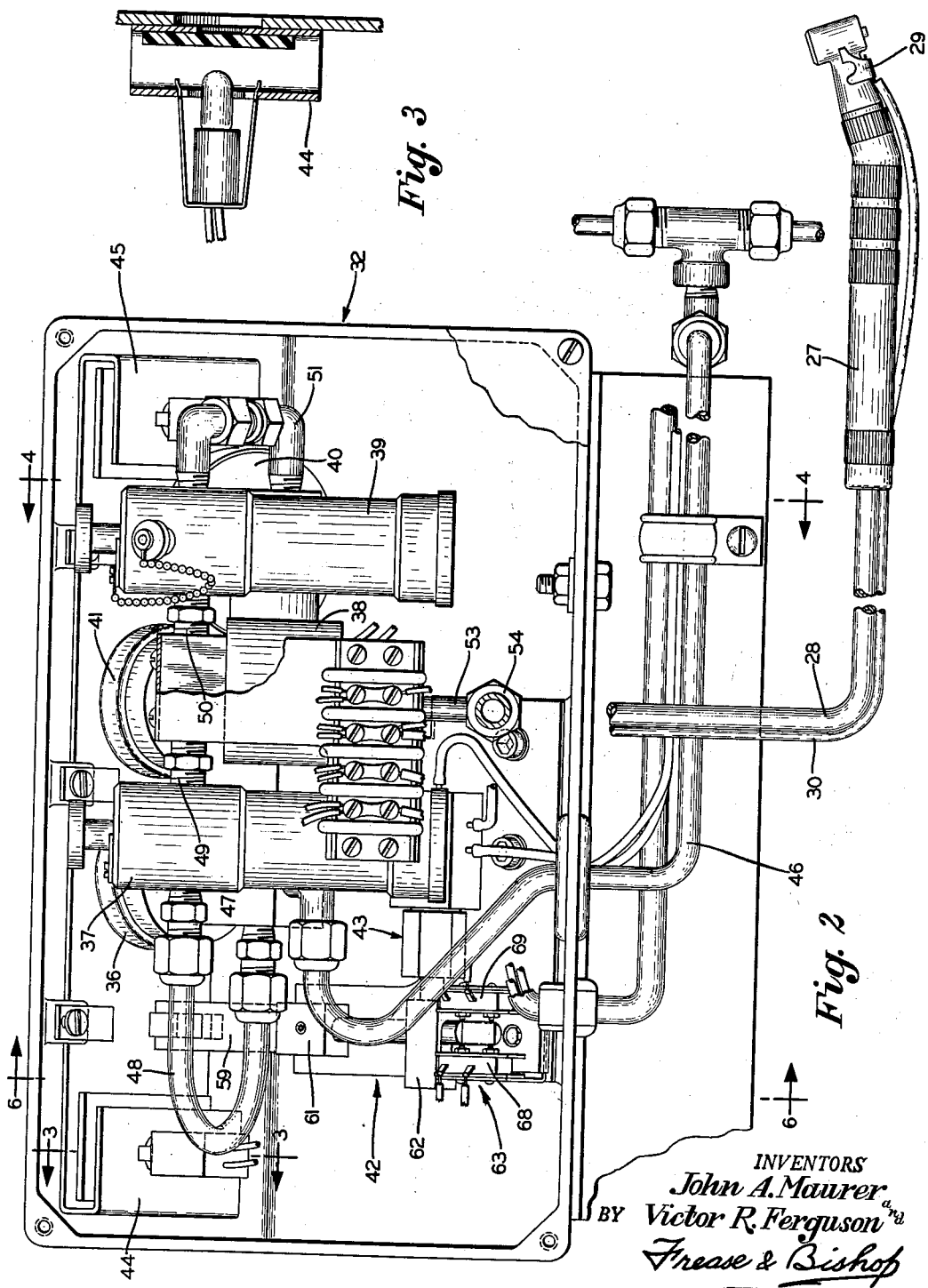
INVENTORS
John A. Maurer and
BY Victor R. Ferguson
Frease & Bishop
ATTORNEYS June 25, 1963  J. A. MAURER ETAL  3,094,780
DENTAL CONTROL ASSEMBLIES
Filed Nov. 1, 1957  6 Sheets-Sheet 4
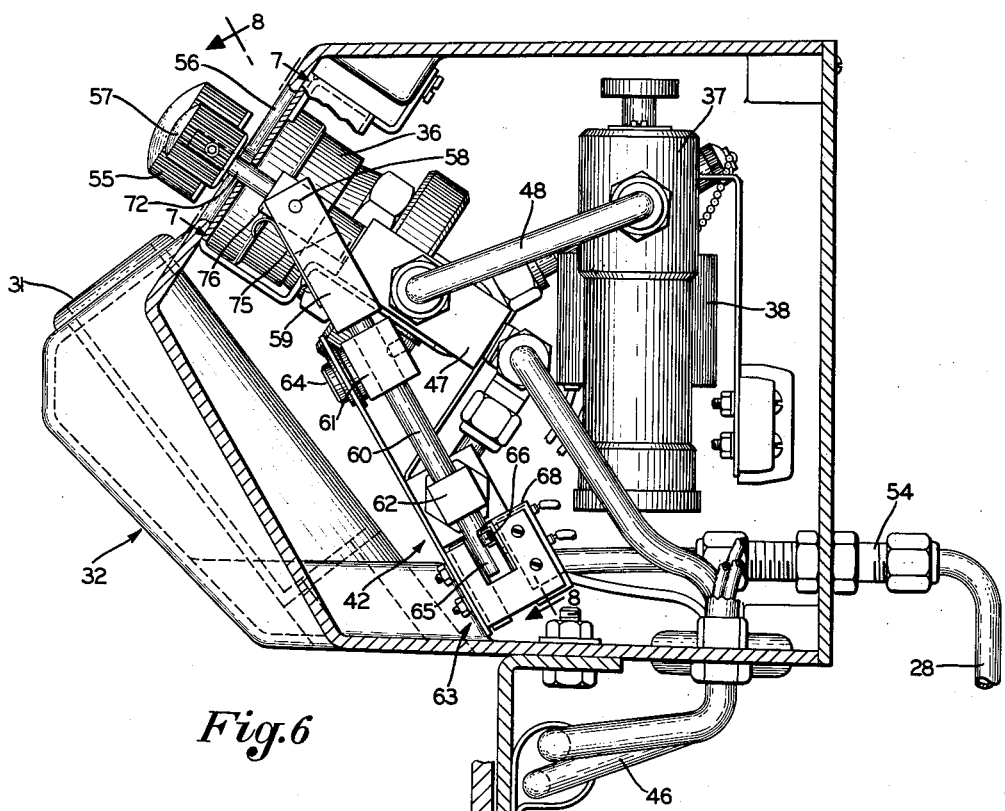
Fig.6
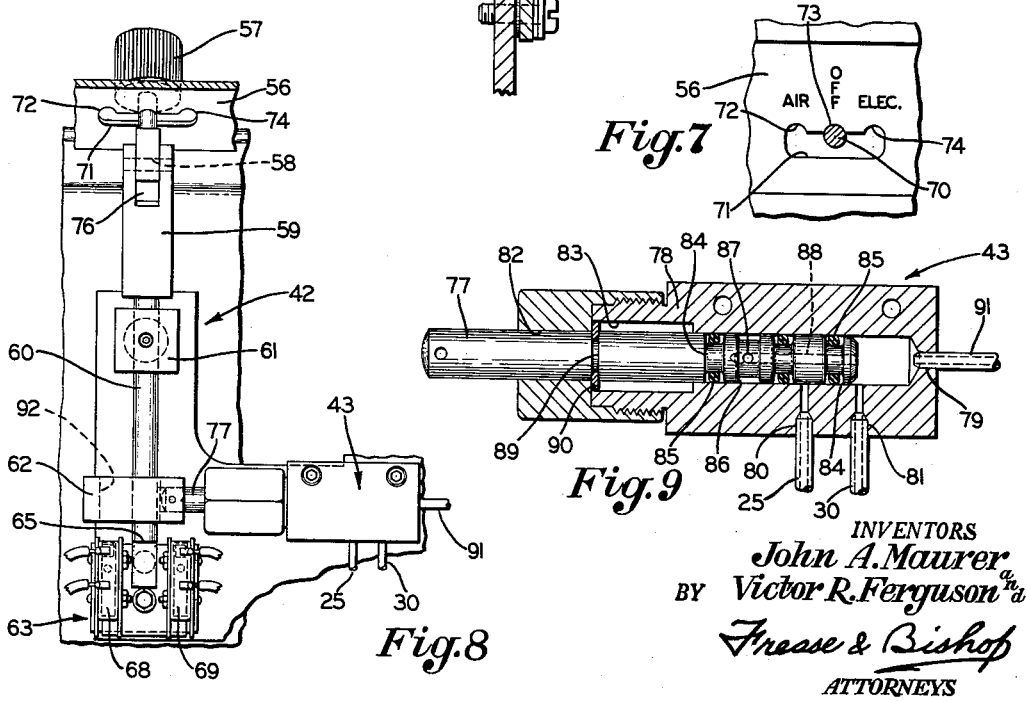
Fig.7
Fig.8
Fig.9
INVENTORS
John A. Maurer
BY Victor R. Ferguson and
Frease & Bishop
ATTORNEYS June 25, 1963

J. A. MAURER ETAL 3,094,780

DENTAL CONTROL ASSEMBLIES

Filed Nov. 1, 1957

6 Sheets-Sheet 5

INVENTORS
John A. Maurer
BY Victor R. Ferguson

Frease & Bishop
ATTORNEYS

United States Patent Office 3,094,780
Patented June 25, 1963

3,094,780
DENTAL CONTROL ASSEMBLIES
John A. Maurer and Victor R. Ferguson, Canton, Ohio, assignors to The Weber Dental Manufacturing Company, Canton, Ohio, a corporation of Ohio
Filed Nov. 1, 1957, Ser. No. 693,984
12 Claims. (Cl. 32—28)

Our invention relates generally to improvements in dental control assemblies and more specifically to a dental control assembly incorporating preferably a conventional dental foot control rheostat arranged so that the rheostat is connected in such a manner that an operator may selectively control a conventional electrically driven dental handpiece and a fluid driven dental handpiece. Furthermore the dental control assembly is preferably also arranged so that coolant sprays on either of the handpieces may be simultaneously controlled with and by the same rheostat as the respective handpiece.

Since the advent of fluid driven handpieces in the dental equipment industry, it has become desirous for a dentist to have both the conventional electrically driven handpiece and a fluid driven handpiece installed adjacent the same dental chair so that either may be used as desired for particular parts of the dental work. The relatively recent fluid driven dental handpiece usually includes a fluid driven turbine so that the handpiece is extremely high speed, therefore having many advantages over the conventional electrically driven handpiece while also having certain disadvantages.

For instance fluid driven dental handpieces, although capable of operating at speeds far exceeding the speed of any know electrically driven handpiece, have a relatively low torque output at such high speeds. Despite the low torque, their high speed makes these fluid driven handpieces extremely advantageous for normal dental drilling work, being highly efficient, requiring little, if any, pressure, and thereby minimizing the discomfort to the patient whose teeth are being worked upon.

Because of the low torque output of these fluid driven handpieces, however, and despite their extreme speed, they are generally unsatisfactory for most heavy polishing work such as for use in the usual teeth cleaning procedures. It is therefore desirous for a dentist to have mounted for ready use both a fluid driven handpiece and an electrically driven handpiece, to be selectively used as desired depending upon the particular type of work being done.

If, however, each of these dental handpiece units is installed separately in the dentist's office, a great amount of space as well as investment is required, since each unit must have some form of control such as the usual foot rheostat, as well as the other necessary controls. Also if coolant spray attachments are to be used with each handpiece, which is highly desirable, these coolant sprays must also be controlled from the foot rheostat or the like which is controlling the respective handpiece, thereby further adding to the complication of the units.

It is therefore desirable to provide a dental control assembly including a single main control means such as a foot rheostat, arranged so that the dentist may selectively control either a conventional electrically driven handpiece or a fluid driven handpiece as desired, and also preferably the respective coolant spray attachment for the particular handpiece being used. It is also desirous to provide a simple, convenient and efficient arrangement of control assembly whereby the dentist may quickly switch from the use of one handpiece to the other without requiring a great amount of time or requiring the setting of complicated controls.

It is, therefore, a general object of the present invention to provide a dental control assembly which satisfies the desires and needs set forth above.

It is a primary object of the present invention to provide a dental control assembly which by one simple control means may be set for controlling a conventional electrically driven handpiece by the conventional foot rheostat or may be set for controlling a fluid driven dental handpiece with the same conventional foot rheostat and without any changes being required on the foot rheostat for controlling the particular handpiece selected.

It is a further object of the present invention to provide a dental control assembly in which the same one simple control that is set for one handpiece or the other to be controlled by the foot rheostat also, during the selective setting thereof switches a coolant supply to the coolant spray of the particular handpiece being controlled.

It is a further object of the present invention to provide a dental control assembly which not only includes the foregoing control means, but further includes the complete distribution and control means for supplying fluids at the desired pressure and in the desired state to the fluid driven handpiece when this handpiece is in use.

Finally, it is an object of the present invention to provide a dental control assembly which accomplishes all of the above objects in a simple and efficient manner, yet is economical to manufacture at a minimum of production cost.

These and other objects are accomplished by the parts, constructions, arrangements, combinations and subcombinations comprising the present invention, the nature of which is set forth in the following general statement, a preferred embodiment of which, illustrative of the best mode in which applicants have contemplated applying the principles, set forth in the following description and illustrated in the accompanying drawings, and which is particularly and distinctly pointed out and set forth in the appended claims forming a part hereof.

In general terms, the dental control assembly comprising the present invention, for use in selectively controlling an electric dental engine driving a dental handpiece and a fluid driven dental handpiece, may be stated as including main control means such as a dental foot rheostat and a main electric power supply connected to the main control means for supplying power to the assembly. Further the assembly includes switch means selectively movable between a first and second position, fluid supply means for supplying fluid to the fluid driven dental handpiece and electric solenoid valve means in the fluid supply means movable between de-energized and energized positions, for preventing the flow of fluid through the fluid supply means when de-energized and allowing the flow when energized.

Still further the assembly includes first electric connection means between the main control means and switch means for transmitting power from the main control means to the switch means, second electric connection means between the switch means and solenoid valve means for transmitting the power from the main control means to the solenoid valve means, to thereby energize the solenoid valve means when the control switch means is in the first position and third electric connection means between the switch means and the electric dental engine for transmitting power from the main control means to the dental engine when the control switch means is in the second position. Finally, the assembly includes means such as a manually movable control knob operatively connected to the switch means for selectively moving the switch means between the first and second positions.

Thus the selection between the use of the electrically driven dental handpiece and the fluid driven dental handpiece is controlled solely by the setting of the means for selectively moving the control switch means, and the main control means, preferably in the form of the conventional dental foot rheostat, will control either handpiece depending only on this particular setting of the control switch means.

If it is desired to provide the usual water-air coolant mixture for cooling the burr in the particular dental handpiece being used, the dental handpiece may be provided with the conventional coolant spray attachments, and the control assembly may further include coolant selector valve means movable between first and second positions, main coolant supply means and coolant solenoid means. The assembly may still further include first secondary coolant supply means between the coolant selector valve means and the coolant spray on the fluid driven dental handpiece for supplying coolant to the fluid driven handpiece coolant spray when the coolant selector valve means is in its first position.

Also the assembly may include secondary coolant supply means between the coolant selector valve means and the coolant spray on the electrically driven dental handpiece for supplying coolant to the electrically driven handpiece coolant spray when the coolant selector valve means is in its second position. Finally the assembly may include means, connected to one of the switch means and the means for selectively moving the switch means, for moving the coolant selector valve means to its first position when the switch means is moved to its first position and for moving the coolant selector valve means to its second position when the switch means is moved to its second position.

Thus when the switch means is moved to its first position the coolant selector valve will also be moved to its first position, and not only will the fluid driven dental handpiece have the fluid thereto controlled by the main control means, but also the main control means, through the coolant selector valve means, will control the supply of coolant to the coolant spray attachment on the fluid driven handpiece. Further when the switch means is moved to its second position, the coolant selector valve means will also be moved to its second position, and the main control means will not only control power to the dental engine of the electrically driven handpiece, but will also control coolant to the coolant spray of the electrically driven handpiece.

Figure 5:
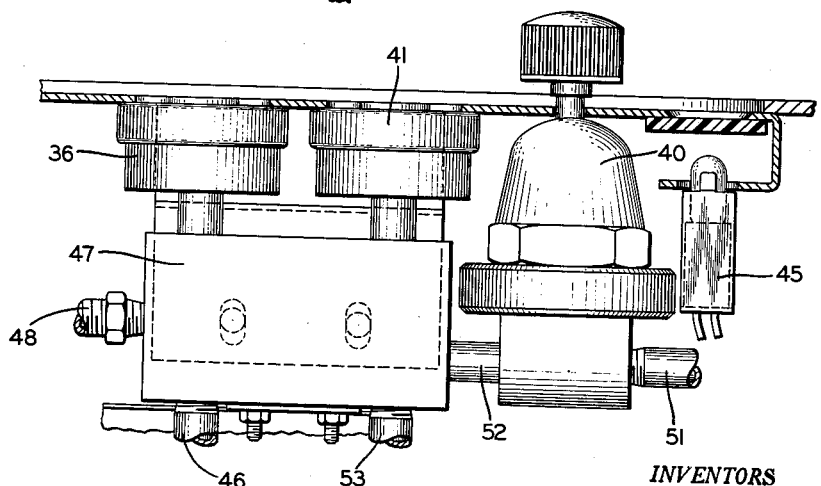
Figure 10:
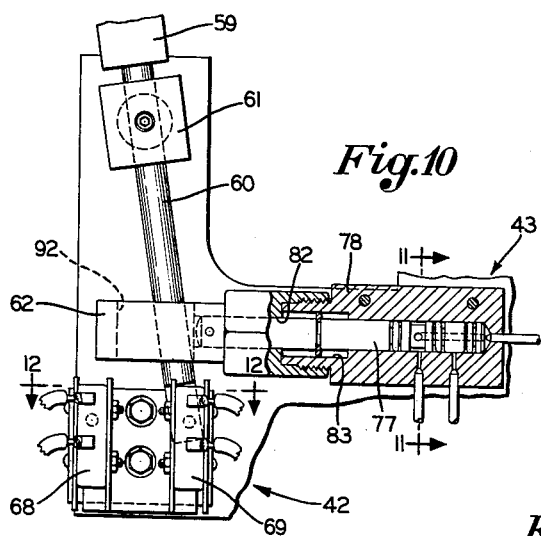
Figure 11:
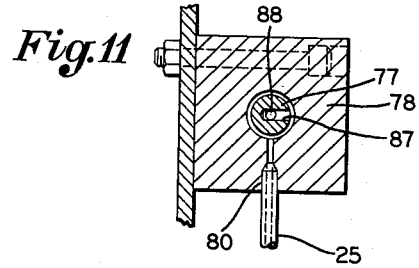
Figure 14:
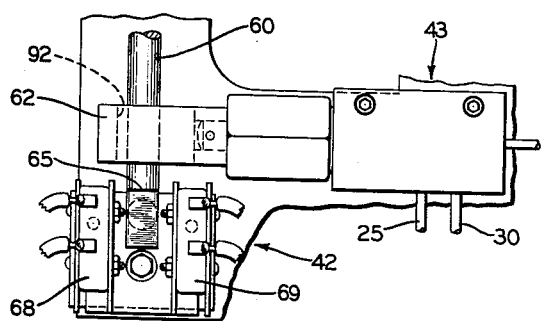
Figure 12:
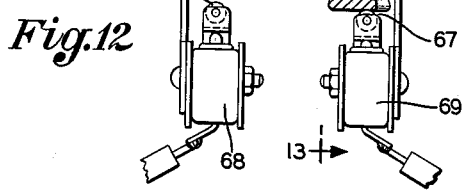
Figure 13:
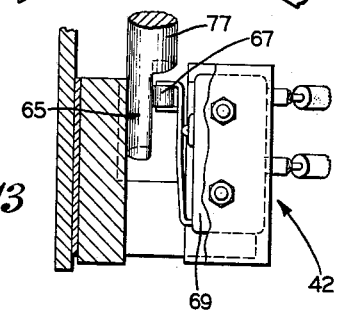
Figure 15:
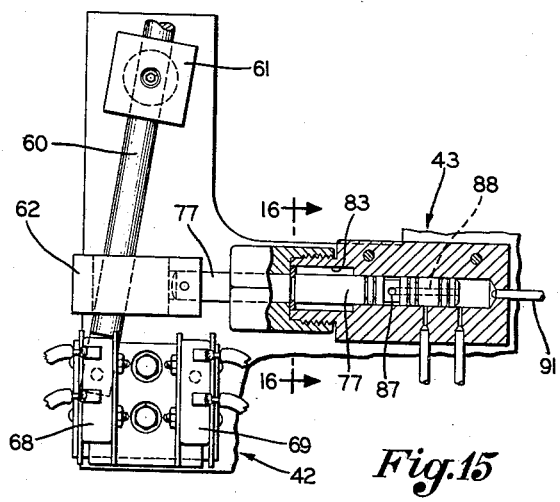
Figure 16:
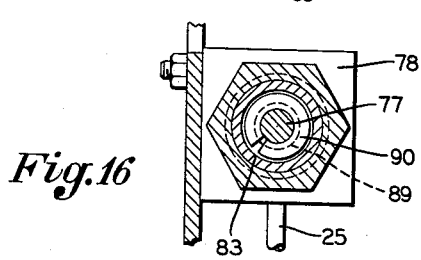
Figure 17:
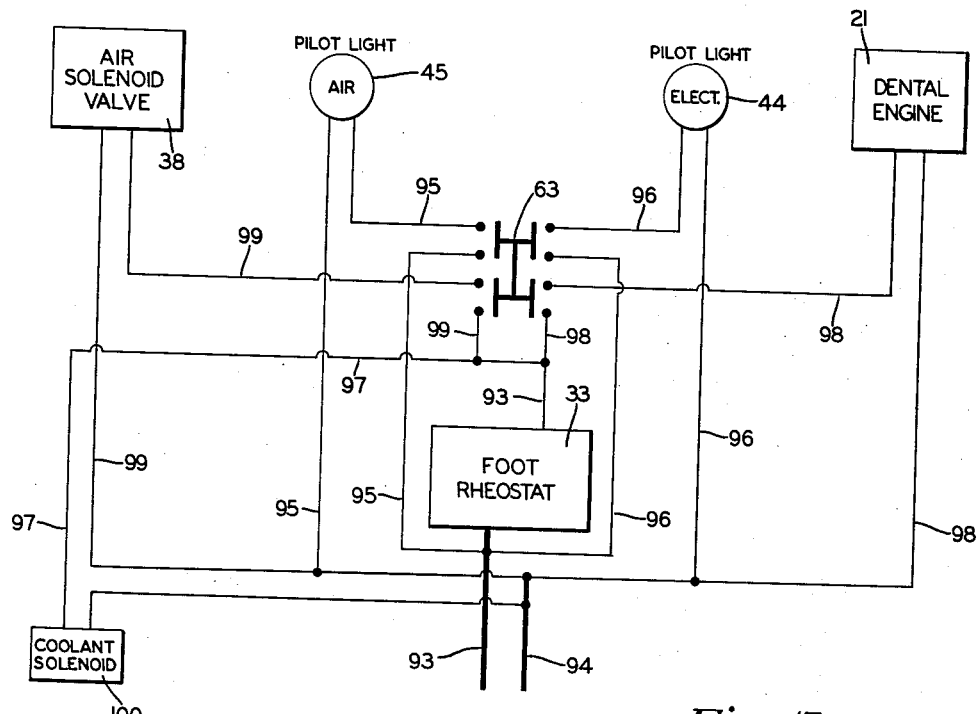
Figure 18:
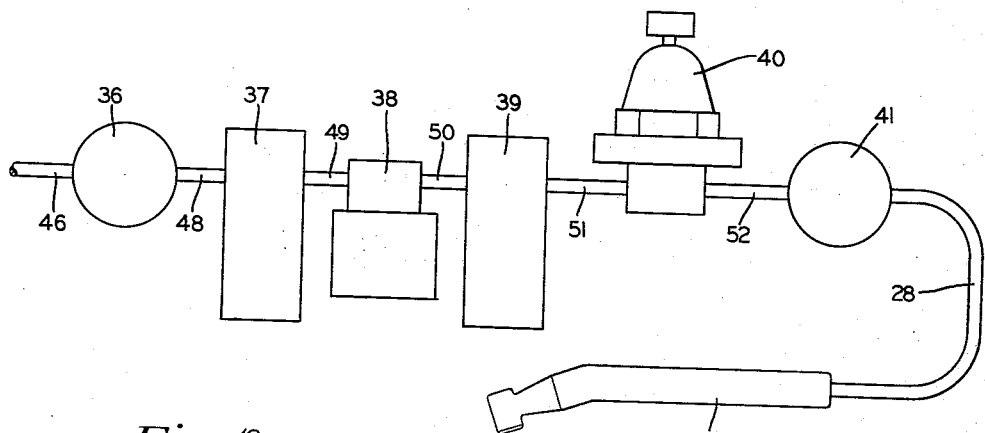

By way of example, an embodiment of the dental control assembly of the present invention is illustrated in the accompanying drawings forming a part hereof, wherein like numerals indicate similar parts throughout the several views, and in which:

FIG. 1 is a fragmentary front elevation showing an electrically driven dental handpiece unit and a fluid driven dental handpiece unit, both units having coolant spray attachments, with the control assembly comprising the present invention operatively connected therewith;

FIG. 2, a fragmentary rear elevation, part in section, showing the control box forming a part of the control assembly with the back cover thereof removed and having a fluid driven dental handpiece unit connected thereto, which handpiece unit makes up one of the dental units controlled by the control assembly;

FIG. 3, a fragmentary sectional view, part in elevation, looking in the direction of the arrows 3—3 in FIG. 2;

FIG. 4, a fragmentary sectional view, part in elevation, looking in the direction of the arrows 4—4 in FIG. 2;

FIG. 5, a fragmentary sectional view, part in elevation, looking in the direction of the arrows 5—5 in FIG. 4;

FIG. 6, a fragmentary sectional view, part in elevation, looking in the direction of the arrows 6—6 in FIG. 2;

FIG. 7, a fragmentary elevation, part in section, looking in the direction of the arrows 7—7 in FIG. 6;

FIG. 8, a fragmentary sectional view, part in elevation, looking in the direction of the arrows 8—8 in FIG. 6;

FIG. 9, a vertical section of the coolant selector valve assembly removed from the control box of FIG. 2;

FIG. 10, a view similar to FIG. 8 showing certain positioning of the switch means and coolant selector valve means;

FIG. 11, a sectional view, part in elevation, looking in the direction of the arrows 11—11 in FIG. 10;

FIG. 12, a fragmentary sectional view, part in elevation, looking in the direction of the arrows 12—12 in FIG. 10;

FIG. 13, a sectional view, part in elevation, looking in the direction of the arrows 13—13 in FIG. 12;

FIG. 14, a view similar to FIG. 8 showing certain positioning of the switch means and coolant selector valve means;

FIG. 15, a view similar to FIG. 8 showing certain positioning of the switch means and coolant selector valve means;

FIG. 16, a sectional view, part in elevation, looking in the direction of the arrows 16—16 in FIG. 15;

FIG. 17, a schematic view of a simplified wiring circuit for the control assembly comprising the present invention;

FIG. 18, a schematic view of the fluid supply subassembly removed from the control box of FIG. 2 and shown connected to a fluid driven dental handpiece.

The dental control assembly comprising the present invention is shown in the drawings adapted for and connected with a conventional electrically driven dental handpiece unit and an air driven dental handpiece unit, both of which are selectively controlled by main control means in the form of a conventional dental foot rheostat. Further each of the dental handpieces is shown provided with a conventional coolant spray attachment and the necessary controls and supply are incorporated in the control assembly for supplying and controlling these coolant spray attachments.

It should be understood, however, that the principles of the present invention may be applied to various types of dental handpieces and furthermore these dental handpieces may be controlled by other main control means than that shown. Also, if it is not desired to provide the dental handpieces with the coolant spray attachments, the coolant supply and control portion of the assembly may be eliminated.

Referring to FIG. 1, the electrically driven dental handpiece unit is generally indicated at 20 and includes an electric dental engine 21, separately connected for driving an electrically driven dental handpiece 22, both of which are mounted on a stand generally indicated at 23 in the usual manner. Further the electrically driven dental handpiece 22 is provided with a conventional coolant spray attachmen 24 which is supplied with preferably an air-water coolant mixture by a secondary coolant supply line 25.

The fluid driven dental handpiece unit generally indicated at 26 includes an air driven dental handpiece 27 supplied with air through a handpiece air supply line 28 and having a conventional coolant spray attachment 29 (shown in FIG. 2) supplied with the same coolant mixture as is supplied to the electrically driven handpiece coolant spray attachment 24 by means of a secondary coolant supply line 30. Further the air driven dental handpiece 27 is shown in FIG. 1 received in a recessed holder 31 mounted on a control box, generally indicated at 32.

Still further, as shown in FIG. 1, the control assembly includes a conventional dental foot rheostat 33 and a conventional coolant supply and control box 34, which box 34 provides the main coolant supply and also includes the usual coolant solenoid control valve, not shown. Finally for convenience of electrical distribution in the assembly, the assembly preferably also includes the usual electrical connection and distribution box 35.

The control box, generally indicated at 32, is best seen in detailed assembly in FIGS. 2, 4 and 6, and includes a line air pressure gauge 36, an air filter 37, an air solenoid control valve 38, an air oiler 39, an air pressure regulator 40 and a handpiece air pressure gauge 41. Further the control box 32 includes an electrical control switch assembly, generally indicated at 42, a coolant selector valve assembly, generally indicated at 43, and may also include the electrically driven handpiece pilot light 44 and air driven handpiece pilot light 45.

The main air supply for the air driven handpiece 27 is received by the control box 32 by the main air supply line 46. Main air supply line 46 extends into the control box 32 and is connected to a connector block 47 upon which connector block the line air pressure gauge 36 and handpiece air pressure gauge 41 are mounted, as shown.

Connector block 47 is constructed so that the air received from the main air supply line 46 passes through the line pressure gauge 36, back into connector block 47, and then through a short coupling 48 connected between block 47 and the air filter 37. From air filter 37 the air passes through coupling 49 connected between filter 37 and the air solenoid control valve 38, through coupling 50 connected between valve 38 and the air oiler 39, and then through coupling 51 connected between oiler 39 and the air pressure regulator 40.

Thereafter the air passes through a coupling 52 (shown in FIG. 5 and schematically in FIG. 18) connected between pressure regulator 40 and the connector block 47. Again connector block 47 is arranged and constructed so that air may pass through block 47 into handpiece air pressure gauge 41 and back into block 47.

After the air passes through pressure gauge 41, connector block 47 is constructed so that the air flows out through a coupling 53 connected between block 47 and a connector 54, and from connector 54 into the handpiece air supply line 28 connected to connector 54, as shown.

Air supply line 28 passes into the air driven dental handpiece 27 so that the air therefrom drives this handpiece. Finally in the particular embodiment shown, since the fluid used is air, the air can be exhausted from the handpiece 27 into the atmosphere; but if other fluids were used, it may be necessary to provide a recovery system for the same.

The particular constructions of the line air pressure gauge 36, air filter 37, air solenoid control valve 38, air oiler 39, air pressure regulator 40 and the handpiece air pressure gauge 41 are conventional. In the particular connections described above, the line air pressure gauge 36 measures the full line pressure from the main air supply line 46 and air filter 37 removes moisture and dirt from this main air supply.

The air solenoid control volve 38 determines whether or not there is air flow through the system to the air driven dental handpiece 27, and this solenoid control valve permits such air flow when energized and stops the air flow when de-energized. The air oiler 39 serves its usual purpose of placing a minute amount of oil in the air flowing therethrough, while air pressure regulator 40 regulates the exact pressure of air desired at handpiece 27, and the handpiece air pressure gauge 41 indicates this exact pressure.

As shown in FIGS. 1, 4, 5 and 6, the pressure regulator 40 is provided with a regulating knob 55 for the convenient setting thereof. Furthermore this knob extends outwardly through and is mounted at the face of the panel 56 on control box 32.

The electrical control switch assembly 42 is provided for controlling the flow of power from foot rheostat 33 to the dental engine 21, thereby driving the electrically driven handpiece 22, or ultimately for controlling power from the foot rheostat 33 to the air solenoid control valve 38, resulting in the foot rheostat 33 controlling the air flow to and driving the air driven handpiece 27. Furthermore, as will be hereinafter more fully described, switch assembly 42 may be selectively manually set to direct power to electric dental engine 21 or solenoid control valve 38 or may be placed in a neutral or "off" position in which power is not directed to either of these devices.

As best seen in FIGS. 2, 6 and 8, switch assembly 42 includes a selector knob 57 extending inwardly through the panel 56, with this knob 57 being pivotally connected at 58 to the upper end of the control block 59. Control block 59 is in turn connected to the upper end of a control rod 60, with rod 60 extending downwardly through a pivot block 61, a valve actuating block 62 and into a double switch arrangement 63.

As shown in FIGS. 6 and 8, the pivot block 61 is pivotally mounted on the control box 32 at 64, so that the selector knob 57, control block 59, control rod 60 and valve actuating block 62 are all pivotal laterally around this point 64. Furthermore, the lowermost end of control rod 60, after passing through the valve actuating block 62, is formed with a cutout switch actuating portion 65 mounted in lateral alignment to engage and depress the switch levers 66 and 67 of the miniature type snap-action switches 68 and 69, respectively, which form a part of the double switch arrangement 63.

Switches 68 and 69 are of the so-called normally "off" type so that when the switch levers 66 and 67 are not depressed, the electrical circuits through these switches are broken, and when these levers are depressed, the electrical circuit is completed permitting power to pass therethrough. Further switch 68 is in an electrical circuit from foot rheostat 33 to the air solenoid control valve 38 with valve 38 controlling the flow of air to the air driven handpiece 27, and switch 69 is in an electrical circuit from foot rheostat 33 to the dental engine 21 with engine 21 driving the electrically driven handpiece 22.

The selector knob 57 is provided with a circular cross-section rod portion 70 which passes through a laterally extending slot 71 formed through the panel 56. Further slot 71 is provided with three equally spaced upwardly extending arcuate portions or notches 72, 73 and 74, as is best seen in FIGS. 7 and 8.

Still further the control block 59 has mounted thereon a spring 75, the upper end of which bears against a block portion 76 connected to the rod portion 70 of selector knob 57. Spring 75 extends from control block 59 against block portion 76 at a point on block portion 76 upwardly of the pivot point 58 so that the rod portion 70 of selector knob 57 is resiliently urged upwardly at all times despite its particular lateral position.

Thus when an operator moves the selector knob 57 to the left as viewed in FIG. 7, the rod portion 70 will be received in the notch 72 of slot 71, the word "air" being marked above this notch 72 as shown in FIG. 7, and at the same time the control rod 60 will assume the position shown in FIG. 15. In this position the switch actuating portion 65 will depress the switch lever 66 of switch 68 so that the circuit through switch 68 will be completed and the foot rheostat 33 will control power to the solenoid control valve 38, thereby controlling the flow of air to the air driven handpiece 27.

When the selector knob 57 is moved to its central position in slot 71, it will be received in notch 73 below the word "off" and control rod 60 will assume the position shown in FIG. 8. In this position the switch actuating portion 65 is midway between the switches 68 and 69 so that the electrical circuits through each of these switches are broken and neither the dental engine 21 nor the solenoid control valve 38 is controlled by the foot rheostat 33.

Finally when selector knob 57 is moved to the right as viewed in FIG. 7, rod portion 70 will be received in the notch 74 above which is the abbreviation of the word "electric," and control rod 60 will assume the position shown in FIG. 10 whereby the switch actuating portion 65 thereof depresses the switch lever 67 of switch 69 to complete the electrical circuit through 69 and permit the foot rheostat 33 to control the electrical power to the dental engine 21.

The coolant selector valve assembly 43 is best seen in FIG. 9 wherein a vertical section of the valve assembly is shown with this valve assembly being detached from the remainder of the control box 32. Referring to FIG. 9, valve assembly 43 includes an actuating rod 77, a casing 78, coolant inlet opening 79 and coolant outlet openings 80 and 81.

Actuating rod 77 is received laterally within casing 78 through an opening 82 which extends into casing 78 from the left-hand side thereof, as viewed in FIG. 9, and extends laterally inwardly to a point spaced from the right-hand side of casing 78. Furthermore opening 82 is provided with an enlarged portion 83 intermediate the length thereof having a purpose to be hereinafter described.

The inner or right-hand end portion of rod 77 is provided with a series of axially spaced grooves 84 within which grooves are received O rings 85 to thereby seal around rod 77 against casing 78 and within opening 82 while still permitting lateral movement of rod 77. Further a coolant flow groove 86 is provided on rod 77 between two of the O-ring grooves 84, with groove 86 being connected through a radial channel 87 with an axially extending channel 88, which channel 88 opens into the casing opening 82 at the right-hand end of actuating rod 77.

Finally a snap ring notch 89 is formed in rod 77 spaced to the left of the last O-ring groove 84 and within the opening enlarged portion 83 to thereby receive a snap ring 90 extending into the enlarged portion 83. Thus snap ring 90 determines the extreme left-hand limit of shifting of actuating rod 77 and, as shown in FIG. 9, in this extreme left-hand position abuts against the casing 78.

Furthermore when actuating rod 77 is in this extreme left-hand position, its right-hand end is spaced from the right-hand extremity of opening 82. The extreme right-hand position of actuating rod 77 is determined by the right-hand end of rod 77 reaching the right-hand extremity of opening 82.

The coolant inlet opening 79 is formed through the right-hand end of casing 78 terminating at opening 82 and the end of the main coolant supply line 91 is received within opening 79. For a more clear understanding, it may be seen in FIG. 1 that the main coolant supply line 91 extends from the coolant supply and control box 34 into control box 32, the operation of which will be hereinafter more clearly described.

Further the end portion of the secondary coolant supply line 25 is received in the opening 80 and the end portion of the secondary coolant supply line 30 is received in the opening 81 both of the lines 25 and 30 being also shown in FIG. 1, with line 25 being connected to the coolant spray 24 on the electrically driven handpiece 22 and the line 30 being connected to the coolant spray 29 on the air driven handpiece 27.

Referring again to FIG. 9, opening 80 is positioned so that it is closed by actuating rod 77 when rod 77 is in its extreme left-hand position as shown in FIG. 9. Also when rod 77 is in this extreme left-hand position, opening 81 is positioned such that it is in communication with opening 82 beyond the right-hand end of rod 77 and thus is in communication with the main coolant supply line 91.

Also when the actuating rod 77 is shifted to its extreme right-hand position as shown in FIG. 10, the opening 81 is closed by rod 77 while opening 80 is in a position in communication with coolant flow groove 86. Thus with the arrangement of the radial channel 87 opening into groove 86 and the axially extending channel 88 connected to radial channel 87, a communication is provided through rod 77 from the main coolant supply line 91 to opening 80 and ultimately secondary coolant supply line 25.

Thus when actuating rod 77 is shifted to its extreme left-hand position as shown in FIG. 9, coolant may be supplied from the coolant supply and control box 34 through the main coolant supply line 91 to the secondary coolant supply line 30 and through line 30 to the coolant spray 29 on the air driven handpiece 27. Furthermore when the actuating rod 77 is shifted to its extreme right-hand position as shown in FIG. 10, coolant may be supplied from the coolant supply and control box 34 through the main coolant supply line 91 to the secondary coolant supply line 25 and through line 25 to the coolant spray 24 on the electrically driven handpiece 22.

As shown in FIGS. 6, 8, 10, 14 and 15, the coolant selector valve assembly 43 is mounted in the control box 32 with the extending end portion of actuating rod 77 connected to the valve actuating block 62 of the electrical control switch assembly 42. Further as can be seen in FIGS. 8, 10, 14 and 15, the valve actuating block 62 is provided with a laterally extending slot 92 formed extending in alignment with control rod 60 and receiving rod 60 therethrough.

As shown in FIGS. 8 and 14, the slot 92 of block 62 is formed so that when control rod 60 is moved either from its position engaging switch lever 66 of switch 68 or switch lever 67 of switch 69 to its disengaged or central position, as shown, neither block 62 nor consequently the actuating rod 77 of the valve assembly 43 will be moved, regardless of whether actuating rod 77 had previously been shifted to its extreme left or right-hand position. As shown in FIG. 10, however, when control rod 60 is moved to its position engaging switch lever 67 of switch 69, the valve actuating block 62 and consequently the actuating rod 77 will be shifted to their extreme right-hand positions providing a communication between the main coolant supply line 91 and the secondary coolant supply line 25; and when control rod 60 is moved to its position engaging switch lever 66 of switch 68 as shown in FIG. 15, valve actuating block 62 and consequently actuating rod 77 are shifted to their extreme left-hand positions thereby providing a communication between main coolant supply line 91 and secondary coolant supply line 30.

Thus when the electrical control switch assembly 42 is moved to its position in which power may be transmitted from the foot rheostat 33 to the dental engine 21 for driving the electrically driven handpiece 22, as shown in FIG. 10, the coolant selector valve assembly 43 is shifted so that coolant may be supplied to the coolant spray 24 on the electrically driven handpiece 22. Furthermore, when the electrical control switch assembly 42 is moved to a position so that power may be supplied from foot rheostat 33 to the air solenoid control valve 38 which regulates the air supply for driving the air driven handpiece 27, the coolant selector valve assembly 43 is shifted so that coolant may be supplied from the main coolant supply line 91 to the coolant spray line 30 and thus to the coolant spray 29 on the air driven handpiece 27.

A simplified wiring diagram is shown in FIG. 17 for a more clear understanding of the construction and operation of the dental control assembly comprising the present invention. As shown in FIG. 17 the main power supply lines are indicated at 93 and 94 with line 93 first being connected to pilot light lines 95 and 96 which bridge the foot rheostat 33. Thereafter line 93 extends through and is subject to the control of foot rheostat 33.

Main supply line 93, after leaving foot rheostat 33, is connected to the coolant solenoid line 97, the dental engine line 98 and the air solenoid valve line 99. Coolant solenoid line 97, from its connection with main supply line 93, extends through the coolant solenoid 100 forming a part of the coolant supply and control box 34, and then returns to the main supply line 94, so that the coolant solenoid 100 is subject to the control of the foot rheostat 33.

Dental engine line 98, from its connection with main supply line 93, extends through a set of right-hand contacts on the double switch arrangement 63 and then is connected through the dental engine 21 and back to the main supply line 94. Pilot light line 96, from its connection with main supply line 93 and after bridging foot rheostat 33, is connected through a second set of right-hand contacts on the double switch arrangement 63 and then it is connected through the pilot light 44 and back to the main supply line 94.

Thus when the double switch arrangement 63 is shifted to its right-hand position, as shown in FIG. 17, completing the circuits through dental engine line 98 and pilot light line 96, the coolant solenoid 100 and dental engine 21 will be subject to the control of the foot rheostat 33 and the circuit through pilot light 44 will be complete lighting this pilot light and indicating that the electrically driven handpiece 22 is ready for operation. As shown in FIG. 1, pilot light 44 will be visible to the operator at 101 on the control panel 56.

Referring again to FIG. 17, air solenoid valve line 99, from its connection with main supply line 93, passes through a pair of left-hand contacts of double switch arrangement 63, through air solenoid valve 38 and then back to the main supply line 94. Further pilot light line 95, from its connection with main supply line 93 and after bridging foot rheostat 33, passes through a second pair of left-hand contacts of the double switch arrangement 63, then through pilot light 45, and back to main supply line 94.

Thus when the double switch arrangement 63 is shifted to its left-hand position as viewed in FIG. 17, completing the circuits through air solenoid valve line 99 and pilot light line 95, the air solenoid valve 38 and coolant solenoid 100 will be subject to the control of foot rheostat 33 and the pilot light 45 will be lit indicating that the air driven handpiece 27 is ready for operation. Again referring to FIG. 1, plot light 45 will be visible at 102 on control panel 56.

It is seen therefore that when the double switch arrangement 63 of the electrical control switch assembly 42 is shifted to the right, as viewed in FIG. 17, power is supplied through the foot rheostat 33 to both the dental engine 21 and the coolant solenoid 100 so that the electrically driven handpiece 22 and coolant spray 24 thereon are selectively controlled by foot rheostat 33, while the air driven handpiece 27 and its coolant spray 29 remain inoperable. Also when the double switch arrangement 63 is shifted to its left position, the air solenoid valve 38 and coolant solenoid 100 are selectively controlled through foot rheostat 33 so that the operation of air driven handpiece 27 and its coolant spray 29 are controlled by foot rheostat 33, while electrically driven handpiece 22 and its coolant spray 24 remain inoperable.

In FIG. 18 is shown a simplified schematic view of the fluid or air supply sub-assembly removed from the control box 32 for providing a more clear understanding of the flow of air from the main air supply line 46. As shown, the air passes from supply line 46 to the line air pressure gauge 36 which indicates the full line pressure, through air filter 37 which removes dirt and moisture from the air, through air solenoid control valve 38 which either permits air flow when energized or stops air flow when de-energized, through air oiler 39 which places a minute amount of oil in the air, through air pressure regulator 40 which may be selectively adjusted to provide the desired air pressure from this point in the system on through the handpiece, through pressure gauge 41 which indicates the pressure of the air ultimately flowing to the air driven handpiece 27, and finally the air flows to air driven handpiece 27, as shown.

In the over-all operation of the dental control assembly comprising the present invention, which assembly incorporates all of the various parts and sub-assemblies hereinbefore described with the particular separate operations thereof, when neither the electrically driven handpiece 22 nor air driven handpiece 27 is to be used, the selector knob 57 will be in its central position as shown in FIG. 1 with the rod portion 70 thereof received in the notch 73 of control panel 56 underlying the word "off" as shown in FIG. 7. At this time the electrical control switch assembly 42 and coolant selector valve assembly 43 will be either in the position shown in FIG. 8 or the position shown in FIG. 14 depending on which handpiece was last used.

When it is desired to use, for example, the air driven handpiece 27, the selector knob 57 is moved laterally to the left, as viewed in FIG. 1, until the rod portion 70 thereof is received in the notch 72 of control panel 56 underlying the word "air." This shifting of knob 57 will move the switch assembly 42 and valve assembly 43 to their respective positions shown in FIG. 15 which will complete the electrical circuit through switch 68 and turn on the air driven handpiece pilot light 45.

At this time the air driven handpiece 27 is ready to be used and may be started merely by actuating foot rheostat 33, which, upon actuation, will energize air solenoid valve 38 thereby supplying air to handpiece 27, and will also energize the coolant solenoid 100 in the coolant supply and control box 34 thereby supplying coolant to the coolant spray 29 on the handpiece 27. Finally the speed of the air driven handpiece 27 may be regulated as desired merely by adjusting the regulating knob 55 which adjusts the air pressure regulator 40 and thereby determines the amount of air flowing to air driven handpiece 27.

If, for example, it is then desired to switch from using the air driven handpiece 27 to the use of the electrically driven handpiece 22, it is merely necessary to move the selector knob 57 laterally to the right, as viewed in FIG. 1, until the rod portion 70 thereof is received in the notch 74 of control panel 56 underlying the abbreviation of the word "electric" shown in FIG. 7. This movement of knob 57 moves the switch assembly 42 and valve assembly 43 to their respective positions shown in FIG. 10, breaking the electrical circuit through switch 68, completing the electrical circuit through switch 69, and thereby turning off the air driven handpiece pilot light 45 and turning on the electrically driven handpiece pilot light 44.

At this time actuation of the foot rheostat 33 will supply power to the dental engine 21 which will drive the electrically driven handpiece 22, and at the same time coolant solenoid 100 in the coolant supply and control box 34 will be energized, supplying coolant to the coolant spray 24 on the electrically driven handpiece 22.

Thus, according to the principles of the present invention, a dental control assembly is provided which by one simple control means, in the particular embodiment shown, the electrical control switch assembly 42 set by movement of the single selector knob 57, may be set for controlling a conventional electrically driven handpiece 22 by the conventional foot rheostat 33 or may be set for controlling a fluid driven dental handpiece 27 with the same conventional foot rheostat 33 and without any changes being required for controlling the particular handpiece selected.

Further, a dental control assembly is provided in which the same one simple control that is set for one handpiece or the other to be controlled by the foot rheostat 33, in this case the electrical control switch assembly 42, also during the selective setting thereof switches a coolant supply by means of the connection between switch assembly 42 and coolant selector valve 43 to the coolant spray 24 or 29 of the particular handpiece being controlled.

Still further, with the dental control assembly of the present invention the control box 32, in addition to the electrical control switch assembly 42 and coolant selector valve assembly 43, contains the complete distribution and control means for supplying fluids, in this case air, at the desired pressure and in the desired state to the air driven handpiece 27 when this handpiece is in use. As before pointed out and schematically shown in FIG. 18, this distribution and control means may include the line air pressure gauge 36, air filter 37, air solenoid control valve 38, air oiler 39, air pressure regulator 40 and handpiece air pressure gauge 41.

Finally according to the principles of the present invention, a control assembly is provided which is relatively simple, requiring substantially only the addition of the control box 32 and the elements contained therein and therewith, thereby economizing valuable floor space in a dentist's office. Further, this control assembly can be provided at a minimum of expense because of its inherent simplicity as hereinbefore explained.

It should be understood that although coolant supply and control box 34, coolant spray attachments 24 and 29, and the coolant selector valve assembly 43 are described and shown in the drawings adapted for use with a water-air coolant mixture, it is not intended to limit the principles of the present invention to that specific coolant. For instance, water can be used alone as a coolant, air can be used alone as a coolant, or other fluids including other liquids can be used as coolants in various mixtures or separately.

Further, devices may be provided in which either a liquid or air may be selectively supplied as a coolant, with these devices also sometimes incorporating, in addition, a means for supplying both of these coolants at the same time, such choice being selectively controlled by the dentist as the circumstances dictate. In the use of the terms coolant supply and control means, coolant spray attachments, coolant selector valve assembly and other terms referring to the coolant system in this specification and in the claims, it is intended that these terms be construed in their broadest sense to include any coolant to be used in the system with the necessary controls therefor.

In the foregoing description, certain terms have been used for brevity, clearness and understanding, but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of the construction shown.

Having now described the invention, the construction, operation and use of a preferred embodiment thereof, and the advantageous, new and useful results obtained thereby; the new and useful construction and reasonable mechanical equivalents thereof obvious to those skilled in the art are set forth in the appended claims.

We claim:

1. The combination of a single main electrical control having a single selectively movable operating member and at least two dental handpiece driving units, each separately actionable by electric power for driving separate dental handpieces; the operating member on the main electrical control being selectively movable between positions transmitting electric power through said main control and interrupting electric power through said main control; control switch means electrically connected to the main electrical control and separately to the two dental handpiece driving units, selectively movable to a position transmitting electric power from the main control to one of said dental handpiece driving units for actuating said one driving unit when the main control operating member is moved to said transmitting position, and selectively movable to a position transmitting electric power from the main control to the other of the dental handpiece driving units for actuating said other driving unit when the main control operating member is moved to said transmitting position; whereby, at least two dental handpiece driving units, each separately driving dental handpieces, may be alternately and selectively controlled through the same main electrical control and by the same operating member on said main electrical control.

2. The combination as set forth in claim 1 in which electrically operated coolant solenoid means is electrically connected for receiving electric power from the main control when the main control operating member is moved to said transmitting position at least when the control switch means is in one of said control switch means positions; whereby, coolant may be supplied to certain of the dental handpieces simultaneously with the driving of said dental handpieces and controlled by the same main electrical control and by the same operating member on said main electrical control.

3. The combination as set forth in claim 1 in which electrically operated coolant control means is electrically connected to the main electrical control and control switch means for receiving electric power from the main control upon movement of the main control operating member to transmitting position at least when the control switch means is in one of said control switch means positions; whereby, coolant may be supplied to certain of the dental handpieces simultaneously with the driving of said dental handpieces and controlled by the same main electrical control and by the same operating member on said main electrical control.

4. The combination of a single main foot electrical control having a single selectively movable operating member movable by foot and at least two dental handpiece driving units, each separately actionable by electric power for driving separate dental handpieces; the operating member on the main foot electrical control being selectively movable by foot between positions transmitting electric power through said foot control and interrupting electric power through said foot control; control switch means electrically connected to the main foot electrical control and separately to the two dental handpiece driving units, selectively movable to a position transmitting electric power from the foot control to one of said dental handpiece driving units for actuating said one driving unit when the foot control operating member is moved to said transmitting position, and selectively movable to a position transmitting electric power from the foot control to the other of the dental handpiece driving units for actuating said other driving unit when the foot control operating member is moved to said transmitting position; whereby, at least two dental handpiece driving units, each separately driving dental handpieces, may be alternately and selectively controlled through the same main foot electrical control and by the same operating member on said foot control.

5. The combination as set forth in claim 4 in which electrically operated coolant solenoid means is electrically connected for receiving electric power from the main foot electrical control when the foot control operating member is moved to said transmitting position at least when the control switch means is in one of said control switch means positions; whereby coolant may be supplied to certain of the dental handpieces simultaneously with the driving of said dental handpieces and controlled by the same main foot electrical control and by the same operating member on said foot control.

6. The combination as set forth in claim 4 in which electrically operated coolant control means is electrically connected to the main foot electrical control and control switch means for receiving electrical power from the foot control upon movement of the foot control operating member to transmitting position at least when the control switch means is in one of said control switch means positions; whereby, coolant may be supplied to certain of the dental handpieces simultaneously with the driving of said dental handpieces and controlled by the same main foot electrical control and by the same operating member on said foot control.

7. The combination of a single main electrical control having a single selectively movable operating member and at least an electric dental engine and an electrically operated fluid solenoid, each separately actionable by electric power for driving an electric engine-driven dental handpiece and for transmitting fluid to drive a fluid-driven dental handpiece, respectively; the operating member on the main electrical control being selectively movable between positions transmitting electric power through said main control and interrupting electric power through said main control; control switch means electrically connected to the main electrical control and separately to the electric dental engine and electrically operated fluid solenoid, selectively movable to a position transmitting electric power from the main control to the electric dental engine for actuating said dental engine when the main control operating member is moved to said transmitting position, and selectively movable to a position transmitting electric power from the main control to the electrically operated fluid solenoid for actuating said fluid solenoid when the main control operating member is moved to said transmitting position; whereby, at least an electric dental engine and electrically operated fluid solenoid, each separately driving an electric engine-driven dental handpiece and transmitting fluid to drive a fluid-driven dental handpiece, respectively may be alternately and selectively controlled through the same main electrical control and by the same operating member on said main electrical control.

8. The combination as set forth in claim 7 in which electrically operated coolant solenoid means is electrically connected for receiving electric power from the main control when the main control operating member is moved to said transmitting position at least when the control switch means is in one of said control switch means positions; whereby, coolant may be supplied to certain of the electric engine-driven dental handpiece and fluid-driven dental handpiece simultaneously with the driving of said dental handpieces and controlled by the same main electrical control and by the same operating member on said main electrical control.

9. The combination as set forth in claim 7 in which electrically operated coolant control means is electrically connected to the main electric control and control switch means receiving electric power from the main control upon movement of the main control operating member to transmitting position at least when the control switch means is in one of said control switch means positions; whereby, coolant may be supplied to certain of the electric engine-driven dental handpiece and fluid-driven dental handpiece simultaneously with the driving of said dental handpieces and controlled by the same main electrical control and by the same operating member on said main electrical control.

10. The combination of a single main foot electrical control having a single selectively movable operating member movable by foot and at least an electric dental engine and an electrically operated fluid solenoid, each separately actionable by electric power for driving an electric engine-driven dental handpiece and for transmitting fluid to drive a fluid-driven dental handpiece, respectively; the operating member on the main foot electrical control being selectively movable by foot between positions transmitting electric power through said foot control and interrupting electric power through said foot control; control switch means electrically connected to the main foot electrical control and separately to the electric dental engine and electrically operated fluid solenoid, selectively movable to a position transmitting electric power from the foot control to the electric dental engine for actuating said dental engine when the foot control operating member is moved to said transmitting position, and selectively movable to a position transmitting electric power from the foot control to the electrically operated fluid solenoid for actuating said fluid solenoid when the foot control operating member is moved to said transmitting poition; whereby, at least an electric dental engine and electrically operated fluid solenoid, each separately driving an electric engine-driven dental handpiece and transmitting fluid to drive a fluid-driven dental handpiece, respectively, may be alternately and selectively controlled through the same main foot electrical control and by the same operating member on said foot control.

11. The combination as set forth in claim 10 in which electrically operated coolant solenoid means is electrically connected for receiving electric power from the foot control when the foot control operating member is moved to said transmitting position at least when the control switch means is in one of said control switch means positions; whereby, coolant may be supplied to certain of the electric engine-driven dental handpiece and fluid-driven dental handpiece simultaneously with the driving of said dental handpieces and controlled by the same foot control and by the same operating member on said foot control.

12. The combination as set forth in claim 10 in which electrically operated coolant control means is electrically connected to the foot control and control switch means for receiving electric power from the foot control upon movement of the foot control operating member to transmitting position at least when the control switch means is in one of said control switch means positions; whereby, coolant may be supplied to certain of the electric engine-driven dental handpiece and fluid-driven dental handpiece simultaneously with the driving of said dental handpieces and controlled by the same foot control and by the same operating member on said foot control.

References Cited in the file of this patent

UNITED STATES PATENTS

| | | |
|---|---|---|
| 1,463,168 | Kintzing | July 31, 1923 |
| 2,542,833 | Page | Feb. 20, 1951 |